(12) United States Patent
Xin

(10) Patent No.: US 8,704,945 B1
(45) Date of Patent: Apr. 22, 2014

(54) MOTION ADAPTIVE DEINTERLACER

(75) Inventor: Jun Xin, Sunnyvale, CA (US)

(73) Assignee: Zenverge, Inc., Santa Clara, CA (US)

( * ) Notice: Subject to any disclaimer, the term of this patent is extended or adjusted under 35 U.S.C. 154(b) by 0 days.

(21) Appl. No.: 13/618,536

(22) Filed: Sep. 14, 2012

(51) Int. Cl.
*H04N 7/01* (2006.01)

(52) U.S. Cl.
USPC .......................................... 348/452; 382/254

(58) Field of Classification Search
None
See application file for complete search history.

(56) References Cited

U.S. PATENT DOCUMENTS

2004/0208384 A1* 10/2004 Lin et al. ...................... 382/254
2007/0206117 A1* 9/2007 Tian et al. ..................... 348/452
2008/0062310 A1* 3/2008 Sato .............................. 348/452

* cited by examiner

*Primary Examiner* — Jefferey Harold
*Assistant Examiner* — Samira Monshi
(74) *Attorney, Agent, or Firm* — Fenwick & West LLP

(57) ABSTRACT

A motion adaptive deinterlacer (MADI) receives two pairs of interlaced fields from a current frame and a reference frame of an input video. The MADI deinterlacer filters noise of the received interlaced fields and detects edges of the received interlaced fields. From the detected edges, the MADI deinterlacer spatially interpolates an output pixel using directional filtering. The MADI deinterlacer also detects motion of the output pixel and calculates temporal constraints of the output pixel based on same parity field difference and/or opposite parity field difference. Based on the temporal interpolation and spatial interpolation of the output pixel, the MADI deinterlacer blends the temporal and spatial interpolation of the output pixel to generate an output pixel in progressive format.

20 Claims, 10 Drawing Sheets

MOTION ADAPTIVE DEINTERLACER

BACKGROUND

1. Field of Art

The disclosure generally relates to video compression, more particularly, to motion adaptive deinterlacing of a video sequence.

2. Description of the Related Art

Deinterlacing is a process of converting interlaced video content (e.g., ordinary TV sequences) to progressive format to be displayed on progressive devices (e.g., computers, plasmas display or projection TV). An interlaced video frame generally consists of two fields, odd/even (also called top/bottom), taken in sequence, each sequentially scanned at odd and even lines of an image sensor. Analog TV is often in interlaced format for less transmission bandwidth requirement and less perceived flicker that a similar frame rate would give using progressive scan. Modern digital displays (e.g., plasmas display TV) are inherently digital in that the display comprises discrete pixels such that the two fields of an interlaced frame need to be combined into a single frame in progressive format.

Deinterlacing a video sequence is challenging because visual artifacts can be visible due to defects, such as edge flicker, blur and line-crawling, caused by ineffective deinterlacing. Conventional deinterlacing methods include intra-interpolation, which uses a single field to reconstruct one progressive frame. One disadvantage of deinterlacing using intra-interpolation is the blur of the reconstructed progressive frame because the vertical resolution is halved. Another conventional deinterlacing method is to combine two interlaced fields into one progressive frame. The problem with this method is that the line-crawling effect occurs in the motion area of the progressive frame.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview—Motion Adaptive Deinterlacing (MADI)

To effective converting an interlaced video, such as 1080i format high-definition TV (HDTV) signals, into progressive format for progressive devices (e.g., plasmas display or projection TV), motion adaptive deinterlacing is proposed with balanced tradeoff of computational complexity and high quality. One embodiment of MADI deinterlacer as disclosed receives two pairs of interlaced fields from a current frame and a reference frame. The MADI deinterlacer filters noise of the received interlaced fields using a blur filter (e.g., a 3×3 Gaussian filter). The MADI deinterlacer detects edges of the received interlaced fields with a Sobel operator. From the detected edges, the MADI deinterlacer spatially interpolates an output pixel using directional filtering to select among 9 possible directions the direction which provides the smallest difference between the spatial neighboring pixels of an output pixel.

The MADI deinterlacer also detects motion of the output pixel based on the four input fields of the current frame and its reference frame. The MADI deinterlacer calculates temporal constraints of the output pixel based on same parity field difference and/or opposite parity field difference. To reduce inaccurately detected motion, the MADI deinterlacer calculates the temporal constraint based on opposite parity field difference to detect finger like patterns and horizontal thin line. Based on the temporal interpolation and spatial interpolation of the output pixel, the MADI deinterlacer blends the temporal and spatial interpolation of the output pixel to generate an output pixel in progressive format. The MADI deinterlacer repeats the above mentioned steps to process the remaining output pixels and generates a progressive output frame comprising the processed output pixels in progressive format.

Computing Machine Architecture

Figure 1:
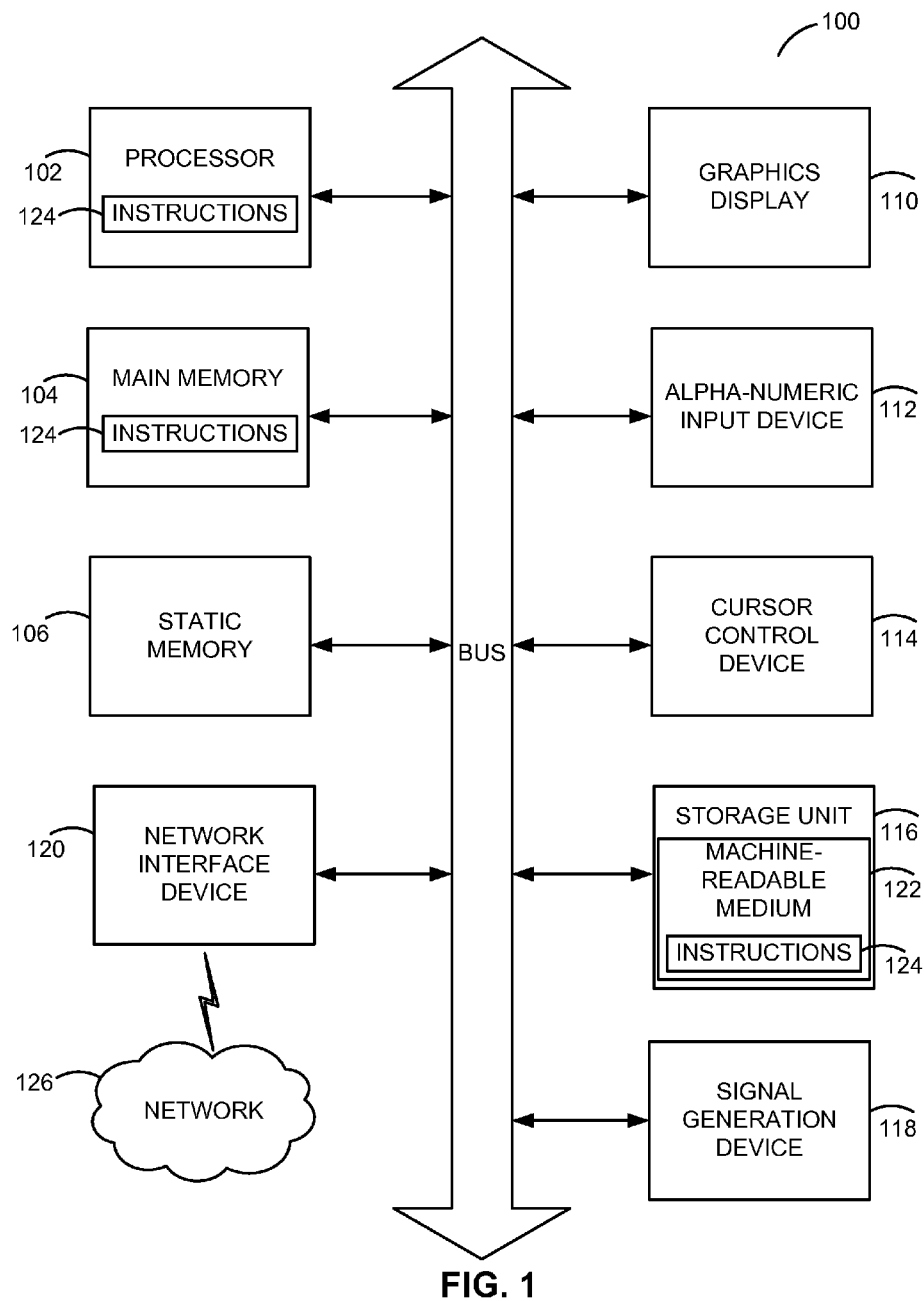
FIG. 1 illustrates one embodiment of components of an example machine able to read instructions from a machine-readable medium and execute them in a processor (or controller).

FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 120, which also are configured to communicate via the bus 108.

The storage unit 116 includes a machine-readable medium 122 (e.g., non-transitory computer-readable storage medium) on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Motion Adaptive Deinterlacing (MADI)

Figure 2:
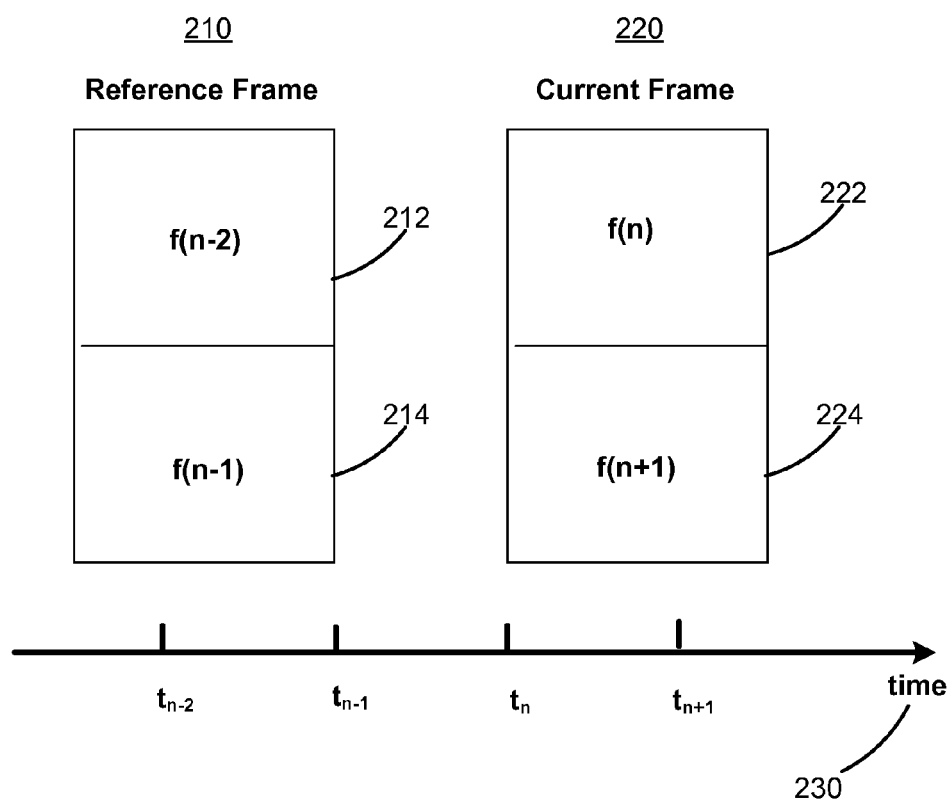
FIG. 2 illustrates an interlaced current frame and an interlaced reference frame with respect to a processing time line for deinterlacing.

In one embodiment, the motion adaptive deinterlacing uses two field pairs consecutive in time for deinterlacing an interlaced video. FIG. 2 illustrates an interlaced current frame 220 and an interlaced reference frame 210 with respect to a processing timeline 230 for deinterlacing. The current frame 220 consists of two fields, f(n) 222 and f(n+1) 224, and the reference frame 210 consists of two fields, f(n−2) 212 and f(n−1) 214. The fields f(n) 222 and f(n−2) 212 are referred to as "top" fields or "odd" fields interchangeably. The fields f(n+1) 224 and f(n−1) 214 are referred to as "bottom" fields or "even" fields interchangeably. The timeline 230 shows the corresponding processing time of the fields. For example, time $t_{n-2}$ is the corresponding processing time for the field f(n−2) 212. Similarly, time $t_{n-1}$ is for the field f(n−1) 214, time $t_n$ is for the field f(n) 222 and time $t_{n+1}$ is for the field f(n+1) 224.

Figure 3:
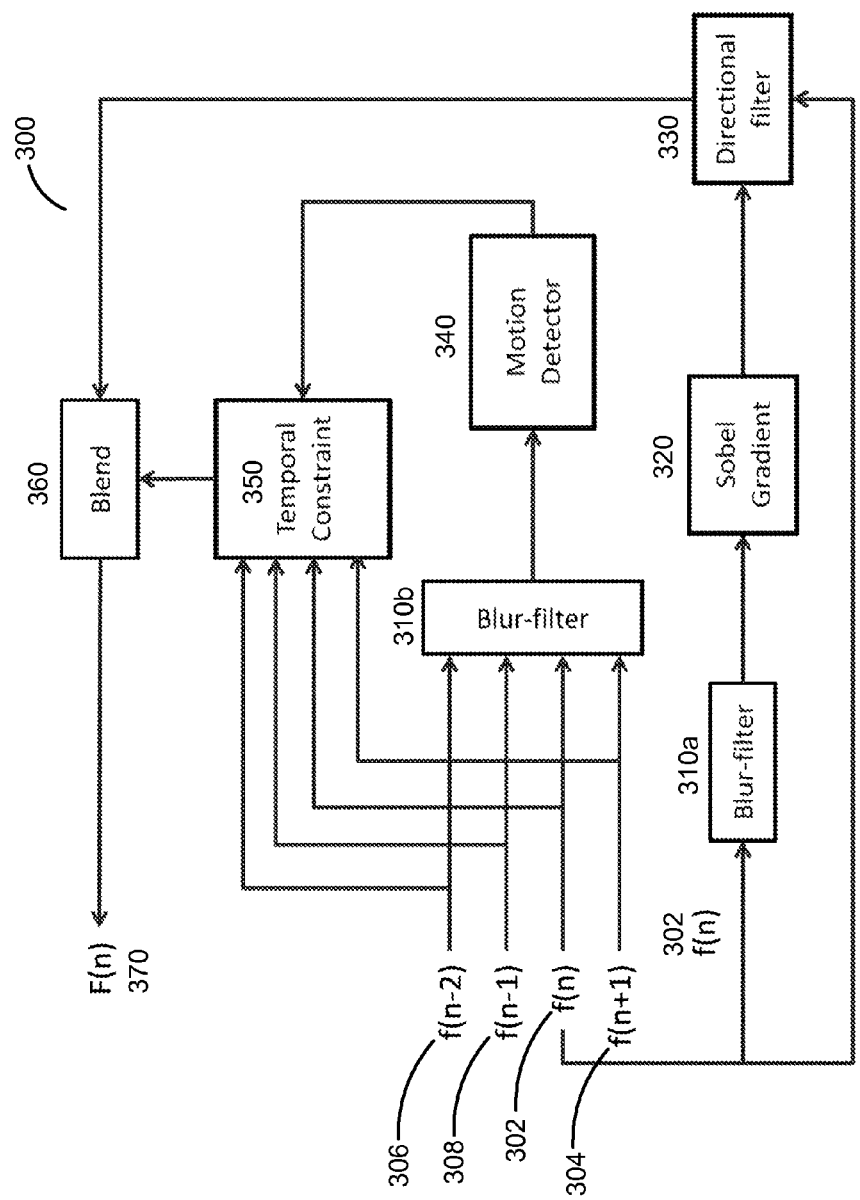
FIG. 3 a system view of motion adaptive deinterlacing (MADI) according to one embodiment.

FIG. 3 a system view of a motion adaptive deinterlacer (MADI) 300 according to one embodiment. The embodiment of the illustrated deinterlacer 300 has two blur filters 310a and 310b (other embodiments may share one blur filter), a Sobel gradient edge detection module 320, a directional filter 330, a motion detector 340, a temporal constraint module 350 and a blend module 360. The deinterlacer 300 receives two field pairs consecutive in time of an interlaced video, processes the fields by one or more deinterlacing processing modules (e.g., blur filters 310, the Sobel gradient edge detection module 320, the directional filter 330, the motion detector 340, the temporal constraint module 350 and the blend module 360) and generates an output video frame in progressive format. For example, the deinterlacer 300 receives two field pairs consecutive in time of an interlaced video, a first pair of fields of a current frame, f(n) 302 and f(n+1) 304, and a second pair of fields of a reference frame, f(n−2) 306 and f(n−1) 308, and generates an output frame in progressive format F(n) 370, which corresponds to the time instant of the first field of the current field pair f(n) 302.

MADI—Edge Detection and Directional Interpolation

Figure 4A:
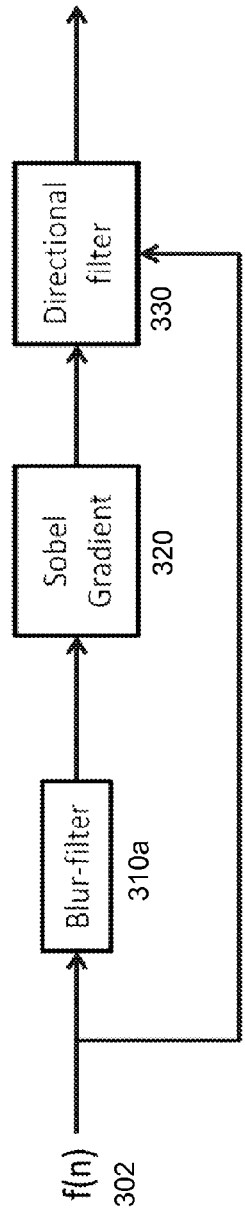
FIG. 4A is a block diagram of edge detection and directional interpolation for motion adaptive deinterlacing according to one embodiment.

The MADI deinterlacer 300 is configured to detect edges of input fields and to interpolate pixels between two scan lines of the input fields. FIG. 4A is a block diagram of edge detection and directional interpolation for motion adaptive deinterlacing according to one embodiment. In one embodiment, the edge detection of the input fields is based on Sobel operator, such as the Sobel gradient by the Sobel gradient module 320. The Sobel gradient module 320 is configured to perform a two-dimensional (2D) spatial gradient measurement to detect edges of the input fields. Sobel operator can be sensitive to image noise, such as random variation of brightness or color information in a digital image. To reduce the noise and improve the efficiency of interpolation by directional filtering, in one embodiment, the MADI deinterlacer 300 applies a blur filter to the input fields before applying the Sobel operator. Embodiments of the blur filter 310a includes a 3×3 Gaussian filter, or a 1-D smoothing filter, which may be Gaussian or simple moving average.

The choice between the embodiments of the blur filter 310a is configurable and can be determined based upon cost-quality tradeoffs. In one embodiment, the blur filter 310a is a 3-tap 1-D filter [1, 2, 1]. Below is a definition of the 3-tap [1, 2, 1] blur filter 310a:

$$p'[x] = (p[x-1] + 2*p[x] + p[x+1] + 2) >> 2$$

where p[x] represents a current input pixel, and p[x−1] and p[x+1] are the immediate neighboring pixels to the left and right of p[x]. The filtered output pixel is denoted as p'[x]. When the current pixel is at the left or right edge of a picture, its missing neighboring pixel uses the border pixel. No pixels outside the picture boundary are outputted.

Figure 4B:
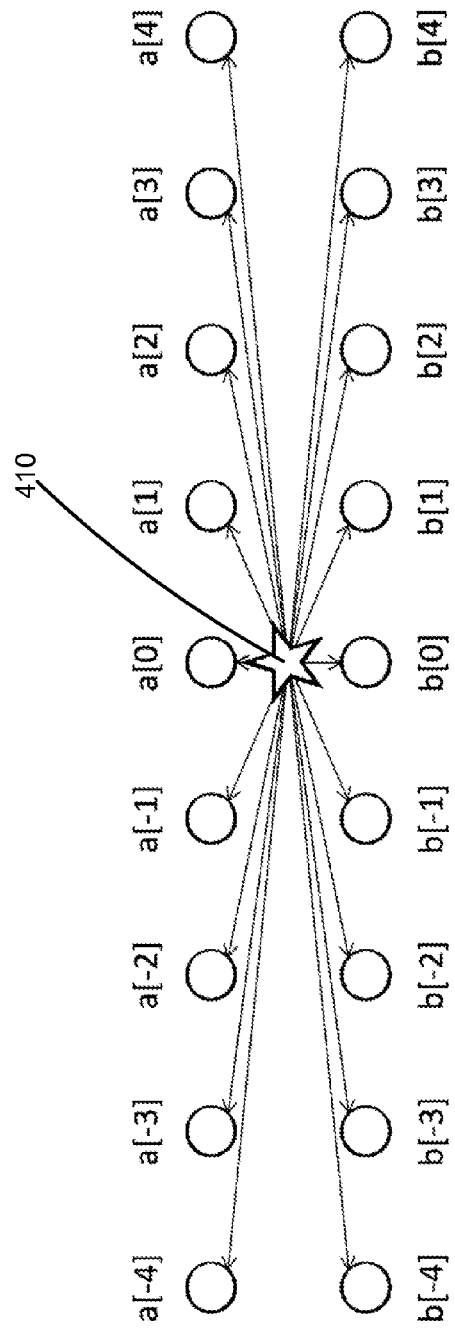
FIG. 4B illustrates an example of directional filtering for an output pixel according to one embodiment.

The directional filter 330 is configured to interpolate missing pixels between two scan lines of interlaced pixels based on the direction of an edge. In one embodiment, the directional filter 330 is configured to investigate 9 possible edge directions that pass through the missing pixel to be interpolated (also referred to as "output pixel") and pick the direction that gives the smallest differences. The interpolation filter is applied using the two pixels centered on the output pixel. FIG. 4B illustrates an example of directional filtering for an output pixel according to one embodiment. The output pixel 410 to be interpolated is marked by the star and is interpolated using nine pixels a[−4:4] on a first scan line and nine pixels b[−4:4] on a second scan line. The pixels a[−4:4] and b[−4:4] represent the pixels of two scan lines of an input field. There are nine directions formed by the pixels a[−4:4] and b[−4:4]: e.g., directions by {a[−4], b[4]}, {a[—3], b[3]}, {a[−2], b[2]}, {a[−1], b[1]}, {a[0], b[0]}, {a[1], b[−1]}, {a[2], b[−2]}, and {a[3], b[−3]}.

To pick the direction that gives the smallest differences, the directional module 330 calculates the difference for each of the nine directions based on the pixel values representing the direction. Table 1 below is example pseudo code for selecting the direction according to one embodiment of the directional filtering.

TABLE 1

Directional Filtering

```
minDiff = abs(a[0] -b[0]); // abs – absolute difference between a[0] and b[0]
bestDir = 0;
maxDir = 4;
if (currCol<maxDir)        // currCol – column index of output pixel
    maxDir = currCol;
if (currCol>=picWidth−maxDir)    // picWidth – picture width
    maxDir = picWidth − currCol − 1;
for (dir=-maxDir; dir<=maxDir; dir++) {
    if (valid[dir]) {
        diff = abs(a[dir]-b[-dir]);
        if (diff<minDiff) {
            minDiff = diff;
            bestDir = dir;
        }
    }
}
```

The output pixel 410, denoted as Ps, is calculated by Equation (1) below:

$$Ps=(a[bestDir]+b[bestDir])\gg 1 \quad (1)$$

In one embodiment, parameter "valid[dir]" is determined based on the gradients of a[dir] and b[−dir], where the gradient is the output of the Sobel operator. To avoid creating artifacts, only if the gradient directions of a[dir] and b[−dir] are consistent with each other will the direction "dir" be considered valid. One embodiment of calculating valid[dir] is as follows in Table 2.

TABLE 2

Valid Direction Calculation

```
for (dir=-4; dir<=4 && dir!=0; dir++)
    if (dir>0)
        _valid[dir] =
        (G(a[dir], b[-dir]) are positive) &&
        (G(a[dir].mag_y > (G(a[dir]).mag_x*dir)) &&
        (G(b[-dir]).mag_y > (G(b[-dir]).mag_x*dir))
    else
        _valid[dir] =
        (G(a[dir], b[-dir]) are negative) &&
        (G(a[dir].mag_y > (G(a[-dir]).mag_x*(-dir))) &&
        (G(b[-dir]).mag_y > (G(b[-dir]).mag_x*(-dir)))
valid[1] = _valid[1]
valid[-1] = _valid[-1]
for (i=2; i<=4; i++)
    valid[i] = _valid[i] & valid[i-1]
    valid[-i] = _valid[-i] & valid[-i+1]
```

"G(a[dir])" being positive means that the horizontal and vertical gradient at pixel "a[dir]" both have the same sign, which indicates that the edge direction is from top right to bottom left. "G(a[dir])" being negative means that the horizontal and vertical gradient at pixel "a[dir]" have different signs, which indicates that the edge direction is from top left to bottom right. "G(a[dir]).mag_y" refers to the magnitude of the vertical (y) gradient, and "G(a[dir]).mag_x" refers to the magnitude of the horizontal (x) gradient.

Figure 5:
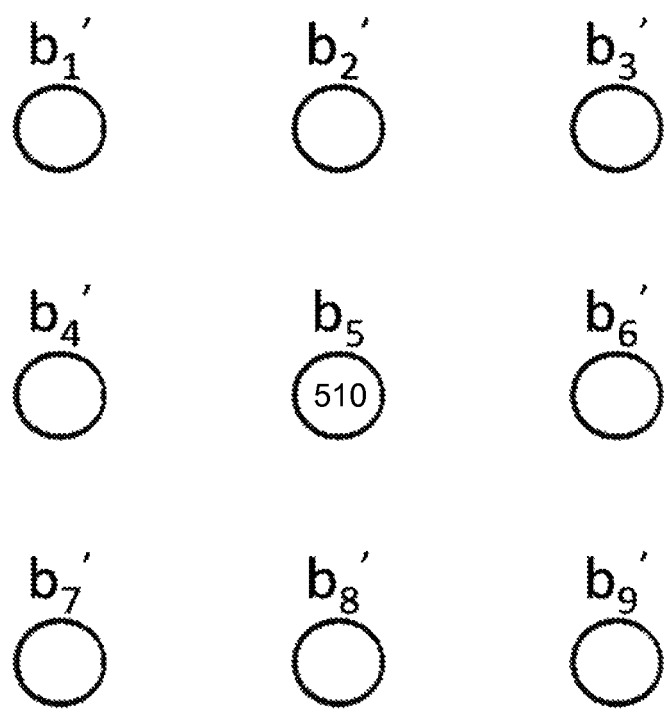
FIG. 5 illustrates an example of blur filtering for an output pixel according to one embodiment.

FIG. 5 illustrates an example of calculating the gradient of a pixel for directional filtering according to one embodiment. Pixel $b_5$ (510) is the pixel for which the gradient is calculated. In one embodiment, the gradient of pixel $b_5$ is computed as below in Table 3 using Sobel operator and the supporting pixels $b_1{'}$ and $b_9{'}$ from blurred input field.

TABLE 3

Pixel Gradient Calculation $G(b_5).x = -b_1{'} - 2 \times b_4{'} - b_7{'} + b_3{'} + 2 \times b_6{'} + b_9{'}$
$G(b_5).y = -b_1{'} - 2 \times b_2{'} - b_3{'} + b_7{'} + 2 \times b_8{'} + b_9{'}$
$G(b_5).mag\_x = abs(G(b_5).x)$
$G(b_5).mag\_y = abs(G(b_5).y)$
$G(b_5).sign\_x = sign(G(b_5).x)$
$G(b_5).sign\_y = sign(G(b_5).y)$ Similar to the blur filter operation, the supporting pixels outside of the picture boundary are extended from the border pixels. No gradients outside the picture boundary are outputted as result of directional filtering.

MADI—Motion Detection and Temporal Constraint

A video sequence often contains moving objects, which further challenges the efficiency of deinterlacing process. The motion detector 340 of FIG. 3 is configured to detect motion areas first and to adaptively deinterlace pixels in the motion areas and in static areas. In one embodiment, the motion detector 340 calculates motion for an output pixel using a window-based sum of absolute differences (SAD) between filtered input fields.

Figure 6:
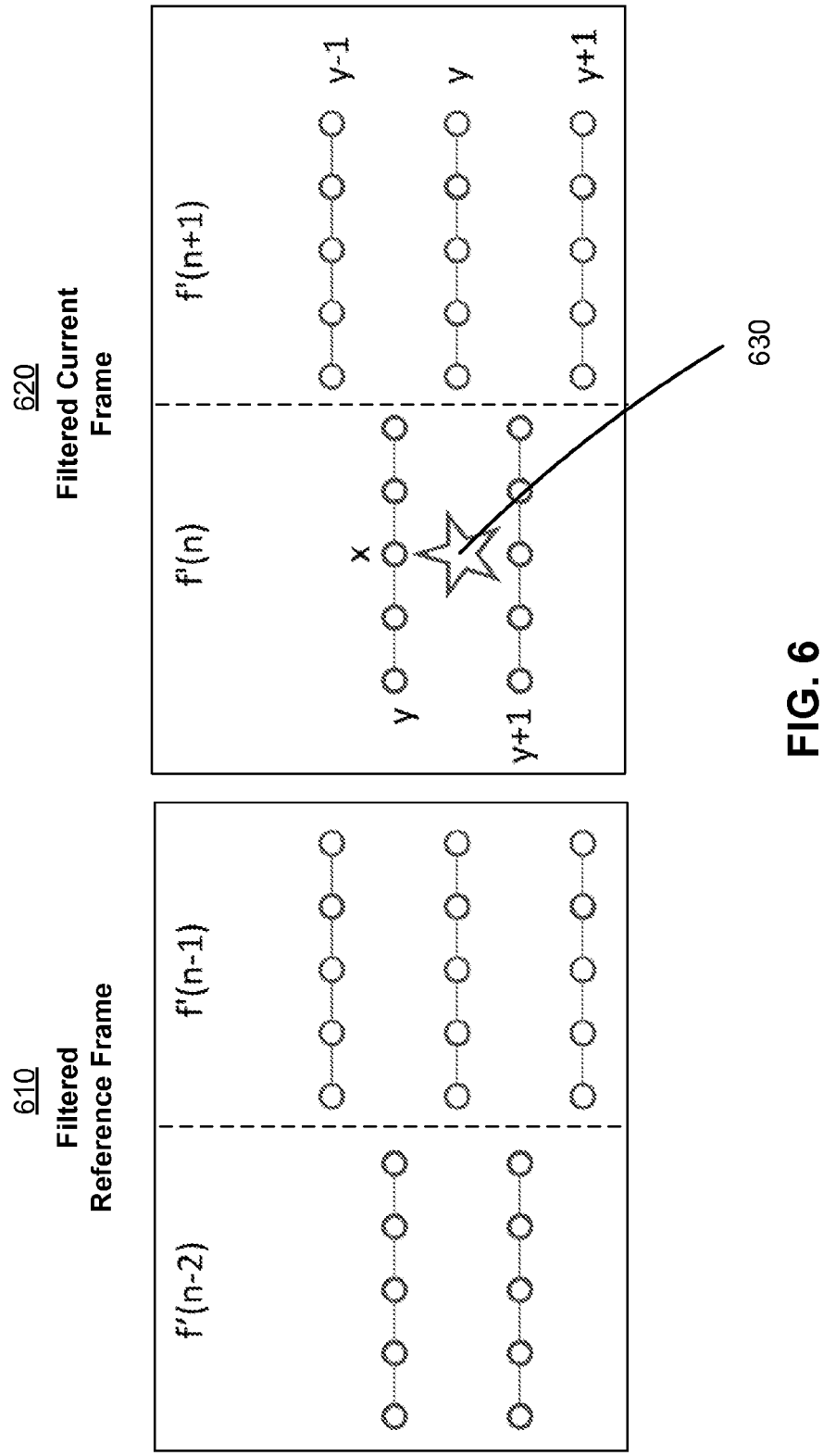
FIG. 6 illustrates an example of motion detection of an output pixel according to one embodiment.

FIG. 6 illustrates an example of motion detection of an output pixel according to one embodiment. f'(n) is a filtered version of current field f(n). In one embodiment, the filter is a simple 1-D 3 tap Gaussian filter. f'(n−2) and f'(n−1) are the two filtered fields from the previous frame 610, and f'(n) and f'(n+1) are the two filtered fields from the current frame 620. Assuming that f'(n) and f'(n−2) are top fields of the current frame 620 and the previous frame 610, respectively, and f'(n+1) and f'(n−1) are bottom fields. (y, x) is the location of an output pixel 630 to be interpolated. The motion detector 340 computes a 5×5 SAD between current frame 620 and previous frame 610, which breaks down to a 5×2 SAD between fields f'(n) and f'(n−2) and a 5×3 SAD between f'(n+1) and f'(n−1). The motion detector 340 compares a final SAD with a motion threshold value ("motionTh") to compute a motion flag value ("motionFlag"), which is filtered over a 5×1 window to obtain a filtered motion flag ("filteredMotionFlag"). When supporting pixels for motion detection are outside of the picture boundary, they are extended from border pixels of the same field.

One embodiment of motion detection is illustrated in Table 4 below.

TABLE 4

Motion Detection

```
satTop = sadBot = 0;
sadPels = 25;
for (j=y; j<=y+1; j++) {
    for (i=-2; i<=2; i++) {
```

TABLE 4-continued

Motion Detection

```
        sadTop += abs(f'(n)[j,i] - f'(n-2) [j,i]);
      }
    }
    for (j=y-1; j<=y+1; j++) {
      for (i=-2; i<=2; i+) {
        sadBot += abs(f'(n+1)[j,i] - f' (n-1) [j,i]);
      }
    }
    sad = sadTop + sadBot;
    motionFlag[y,x] = (sad > (sadPels*motionTh+motionOff));
    filteredMotionFlag[y,x] = false;
    for (k=-2; k<=2; k++) {
      filteredMotionFlag [y,x] | = motionFlag[x, x+k];
    }
```

Parameter "motionTh" is a 4-bit unsigned integer representing a motion threshold value and parameter "motionOff" is an 8-bit signed integer representing a motion offset value. In one embodiment, the default value of both "motionTh" and "motionOff" is 4. Parameter "filteredMotionFlag[y,x]" indicates whether motion is detected for current pixel at location [y,x]. "sad" parameter stores the SAD for the output pixel. In one embodiment, the motion detector 340 stores the sum of absolute difference and filtered motion flag of the output pixel in a variable "motionInfo" in a storage place for further deinterlacing process. The motion detection results are computed by Equation (2) below:

motionInfo.motionFlag=filteredMotionFlag[y,x]

motionInfo.sad=max(sad at {x−2,x−1,x,x+1,x+2})

motionInfo.sadPels=sadPels     (2)

It is noted that pixel value changes temporally and an output pixel from deinterlacing is expected to be correlated to the temporal differences of its neighboring pixels (spatial and temporal neighbors). In one embodiment, the temporal constraint module 350 is configured to compute a bound of temporal changes for a target output pixel. To compute the temporal constraint, there are two categories of differences to consider: (1) same parity difference (e.g., even-to-even fields or odd-to-odd fields) and (2) opposite parity difference (also called "interline difference"). Both categories of difference are related to temporal differences around a target output pixel.

Figure 7A:
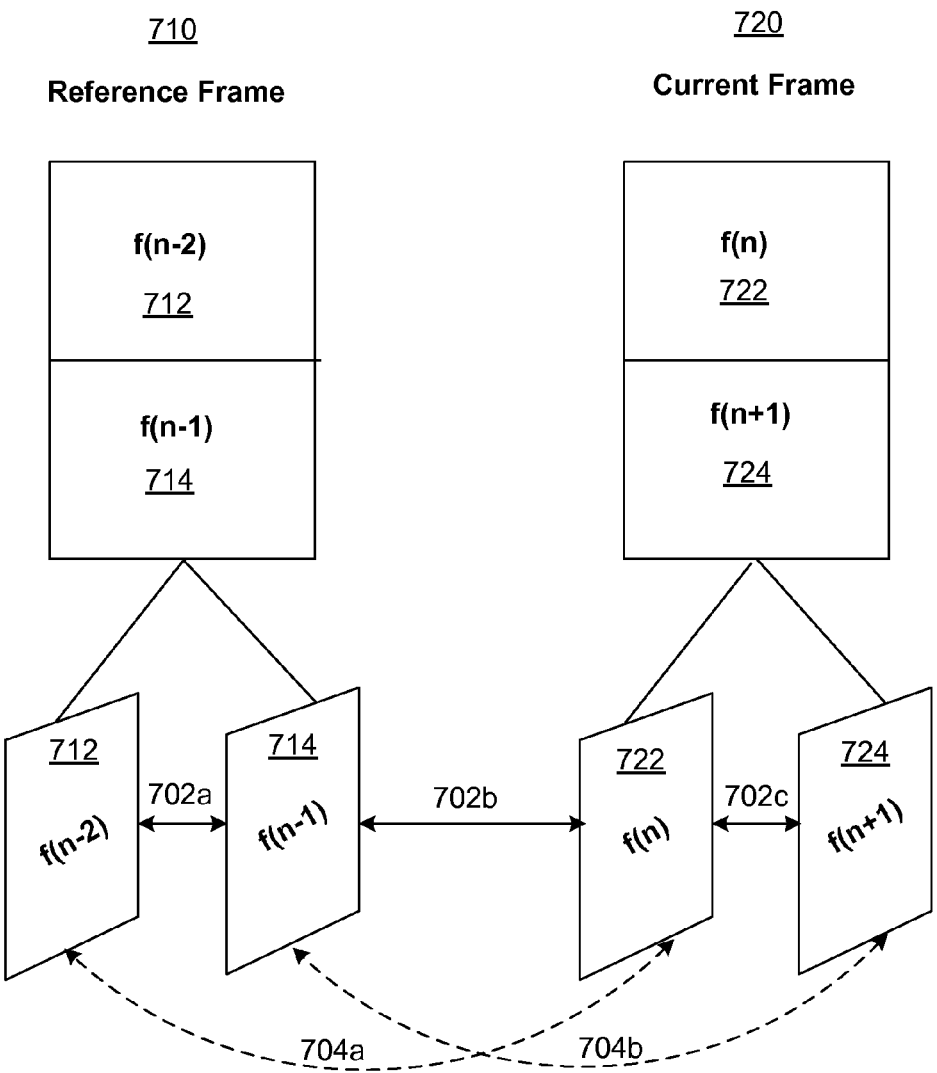
FIG. 7A illustrates an example of calculating temporal constraints of an output pixel based on different parity fields or same parity fields of a current frame and a reference frame according to one embodiment.

FIG. 7A illustrates an example of calculating temporal constraint of an output pixel based on same parity difference or opposite parity difference according to one embodiment. The current frame 720 has two fields: f(n) 722 and f(n+1) 724 and its reference frame 710 has two fields: f(n−2) 712 and f(n−1) 714. The group of same parity difference includes the difference 704a between the fields f(n−2) 712 and f(n) 722 and the difference 704b between the fields of f(n−1) 714 and f(n+1) 724. The group of opposite parity difference includes the difference 702a between the fields f(n−2) 712 and f(n−1) 714, the difference 702b between the fields f(n−1) 714 and f(n) 722 and the difference 702c between the fields f(n) 722 and f(n+1) 724.

The temporal constraint of an output pixel provides a bound of temporal changes of the output pixel in terms of the correlation of the output pixel to the temporal differences of its neighboring pixels. The degree of the bound of the temporal changes indicates the type of interpolation to be used to interpolate the output pixel. If the bound is zero, i.e., a pixel is considered still/no motion, the output pixel is temporally interpolated. If the bound is large, i.e., there is no temporal correlation or there is detectable motion, the output pixel is spatially interpolated. If the bound is between the above two extremes, i.e., the bound is not zero or too large, the output pixel is a blend of temporal and spatial interpolations.

Figure 7B:
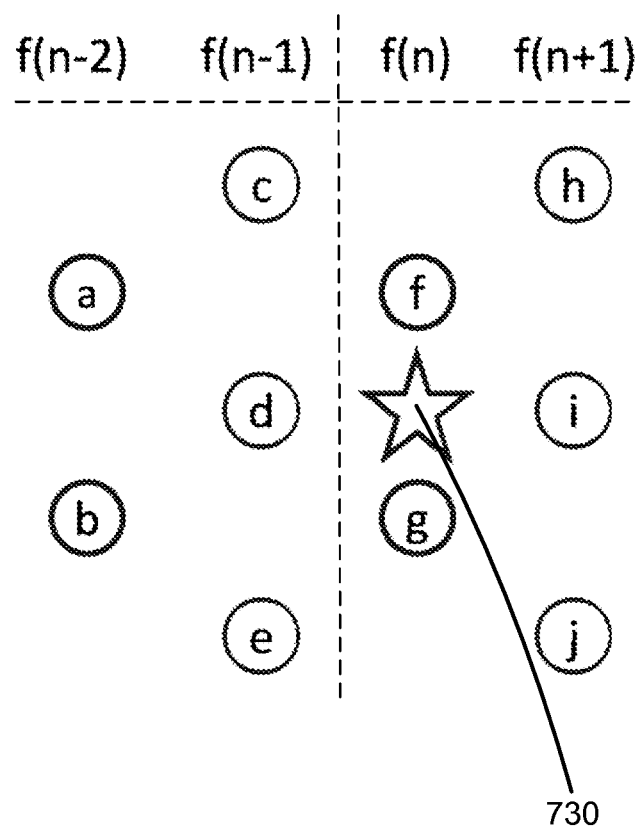
FIG. 7B illustrates an example of calculating temporal constraints of an output pixel based on same parity fields of a current frame and a reference frame according to one embodiment.

FIG. 7B illustrates an example of calculating temporal constraint based on same parity difference according to one embodiment. The output pixel 730 of the field f(n) of the current frame is to be interpolated using one or more pixels of the input fields, including pixels "a", "b" from field f(n−2), "c", "d", "e" from field f(n−1), "f" and "g" from field f(n) and "h", "i" and "j" from field f(n+1). In one embodiment, the temporal constraint module 350 calculates the temporal constraint based on same parity difference as follows:

$$d0 = abs(i-d);$$

$$d1 = abs(f-a);$$

$$d2 = abs(g-b);$$

$$tdiff = max(d0, (d1+d2+1) >> 1) \quad (3)$$

where pixels "a", "b", "d", "f", "g" and "i" are pixels of the input fields and the temporal constraint parameter "tdiff" indicates how much pixel changes temporally for pixels around the output pixel 630. Other embodiments may use additional same parity differences, e.g., difference between pixels "c" and "h" and difference between pixels "e" and "j" to make the temporal constraint more reliable.

Sometimes there are cases where the temporal constraint based on same parity difference and motion detection of the output pixel does not indicate motion of the output pixel, but there are still chances that the output pixel may be moving. For example in a panning scene, a vertical line may move from a previous frame to a current frame in a way such that it coincides with another vertical line from the previous frame. In this case, same parity differences may be near zero and no motion can be detected this way. If this pixel is falsely detected as still, interlaced artifacts (e.g., finger like patterns) can show up, that is annoying and unacceptable.

To avoid interlaced artifacts described above, the temporal constraint module 350 is configured to compute interline differences between opposite parity fields and to set the temporal constraint based on the interline difference at least as large as the interline difference. Following steps in Table 5 show how the interline difference "ilDiff1" for a current instance "n" and its previous instance "n−1" are calculated, where all source pixels "a" through "j" are denoted in FIG. 7B.

TABLE 5

Interline Differences for Finger Patterns Detection p0 (n) = (h + c + 1) >> 1;
p1 (n) = f;
p2 (n) = (i + d + 1) >> 1;
p3 (n) = g;
p4 (n) = (j + e + 1) >> 1;
d43 (n) = p4-p3;
d01 (n) = p0-p1;
d23 (n) = p2-p3;
d21 (n) = p2-p1;
ilMin1 (n) = min(min(d23 (n), d21 (n)), max (d01(n), d43 (n)));
ilMax1 (n) = max(max(d23 (n), d21 (n)), min (d01(n), d43 (n)));
p0 (n−1) = c;
p1 (n−1) = (a + f + 1) >> 1;
p2 (n−1) = d;
p3 (n−1) = (b + g + 1) >> 1;
p4 (n−1) = e;
d43 (n−1) = p4-p3;
d01 (n−1) = p0-p1;

TABLE 5-continued

Interline Differences for Finger Patterns Detection d23 (n−1) = p2-p3;
d21 (n−1) = p2-p1;
ilMin1 (n−1) = min(min(d23 (n−1), d21 (n−1)), max(d01 (n−1), d43 (n−1)));
ilMax1 (n−1) = max(max(d23 (n−1), d21 (n−1)), min(d01 (n−1), d43 (n−1)));

The temporal constraint based on interline differences can be computed using Equation (4) below:

$$ilDiff1(n)=\max(ilMin1(n),-ilMax1(n))$$

$$ilDiff1(n-1)=\max(ilMin1(n-1),-ilMax1(n-1)) \quad (4)$$

Parameter "ilDiff1" indicates the interline difference between opposite parity fields for interlaced finger like patterns.

Similar to the finger like artifacts, there is another case where a horizontal thin line, e.g., one pixel thin (in a frame grid), may show up as an isolated line. This case also needs to be detected and processed properly. The difference between finger like artifacts and horizontal thin line case is that the horizontal thin line detection can only be applied when there is motion detected.

Following steps in Table 6 show how the interline difference "ilDiff2" is calculated, that is the temporal constraint for thin horizontal line detection.

TABLE 6

Interline Differences for Horizontal Thin Line Detection ilMin2 (n) = min(d23 (n), d21(n));
ilMax2 (n) = max(d23 (n), d21(n));
ilMin2 (n−1) = min(d23 (n−1), d21(n−1));
ilMax2 (n−1) = max(d23 (n−1), d21(n−1));

The temporal constraint based on interline differences can be computed using Equation (5) below:

$$ilDiff2(n)=\max(ilMin2(n),-ilMax2(n))$$

$$ilDiff2(n-1)=\max(ilMin2(n-1),-ilMax2(n-1)) \quad (5)$$

Depending on the probability and the presence of motion, the final interline difference, "ilDiff", is computed as follows in Table 7, where "motionInfo" is from Equation (2), "ilDiff1" and "ilDiff2" are from Equation (4) and Equation (5) respectively.

TABLE 7

Final Interline Differences Calculation if (motionInfo.motionFlag) {
   diff1 = max(ilDiff1(n), ilDiff1(n−1));
   diff2 = max(ilDiff2(n), ilDiff2(n−1));
   alpha = 16 − ((motionInfo.sad*2/motionInfo.sadPels) − (ilDiffSadOff));
   alpha = max(0, min(alpha, 16));
   ilDiff = (diff1 * alpha + diff2 * (16−alpha) + 8) >> 4;
}
else {
   ilDiff = median(ilDiff1(n) at {x−2, x−1, x, x+1, x+2});
}

Parameter "ilDiffSadOff" is an 8-bit unsigned integer with a default value of 8.

When no motion is detected, the temporal constraint module 350 is configured to detect finger like patterns only and to compute the temporal constraint accordingly. A 5-median filter is used to make the finger like pattern detection more accurate, since there are cases where false detection hurts the sharpness of specific letters, for example, left corner of the digit "4" symbol. On the other hand, when motion is more likely, both finger and thin line detectors are likely to be detected. A blend of these two constraints is calculated to provide a smooth transition from finger like pattern constraint to thin line constraint. In other words, when motion is almost certain, i.e. when "motionInfo.sad" value is big, horizontal lines that are one pixel thin (on frame grid) will be blurred and disappear.

Responsive to the comparison of the temporal constraint based on same parity field differences, tdiff, and the temporal constraint based on interline difference, the temporal constrain module 350 is configured to calculate the final temporal constraint, TDIFF, of the output pixel as follows:

$$TDIFF=\max(tdiff,ildiff) \quad (6)$$

The final temporal constraint is used to blend spatial and temporal interpolations to generate the output pixel in progressive format.

MADI—Blending Spatial and Temporal Interpolations

The blend module 360 is configured to combine the spatial interpolation and temporal interpolation of an output pixel to generate the output pixel in progressive format. The combining process is also referred to as blending. The spatial interpolation of the output pixel, $P_s$, is from directional filtering and is described by Equation (1) above. The temporal interpolation of the output pixel, $P_t$, is generated as follows:

$$P_t=(d+i+1)>>1 \quad (7)$$

where parameter "d" is the pixel from filed f(n−1) and parameter "i" is the pixel from field f(n+1). The blend module 360 is configured to generate the output pixel in progressive format, P, as follows:

$$P=\max(\min(Ps,Pt+TDIFF),Pt-TDIFF) \quad (8)$$

The determination of applying 4-field deinterlacing depends on whether there is motion detected of the output pixel. In other words, if motion of the output pixel is detected, 4-field deinterlacing is applicable; otherwise, only spatial interpolation of the output pixel is used. The motion adaptive deinterlacer 300 repeats the deinterlacing operations disclosed above for the remaining output pixels and generates a progressive frame comprising the deinterlaced output pixels in progressive format.

Figure 8:
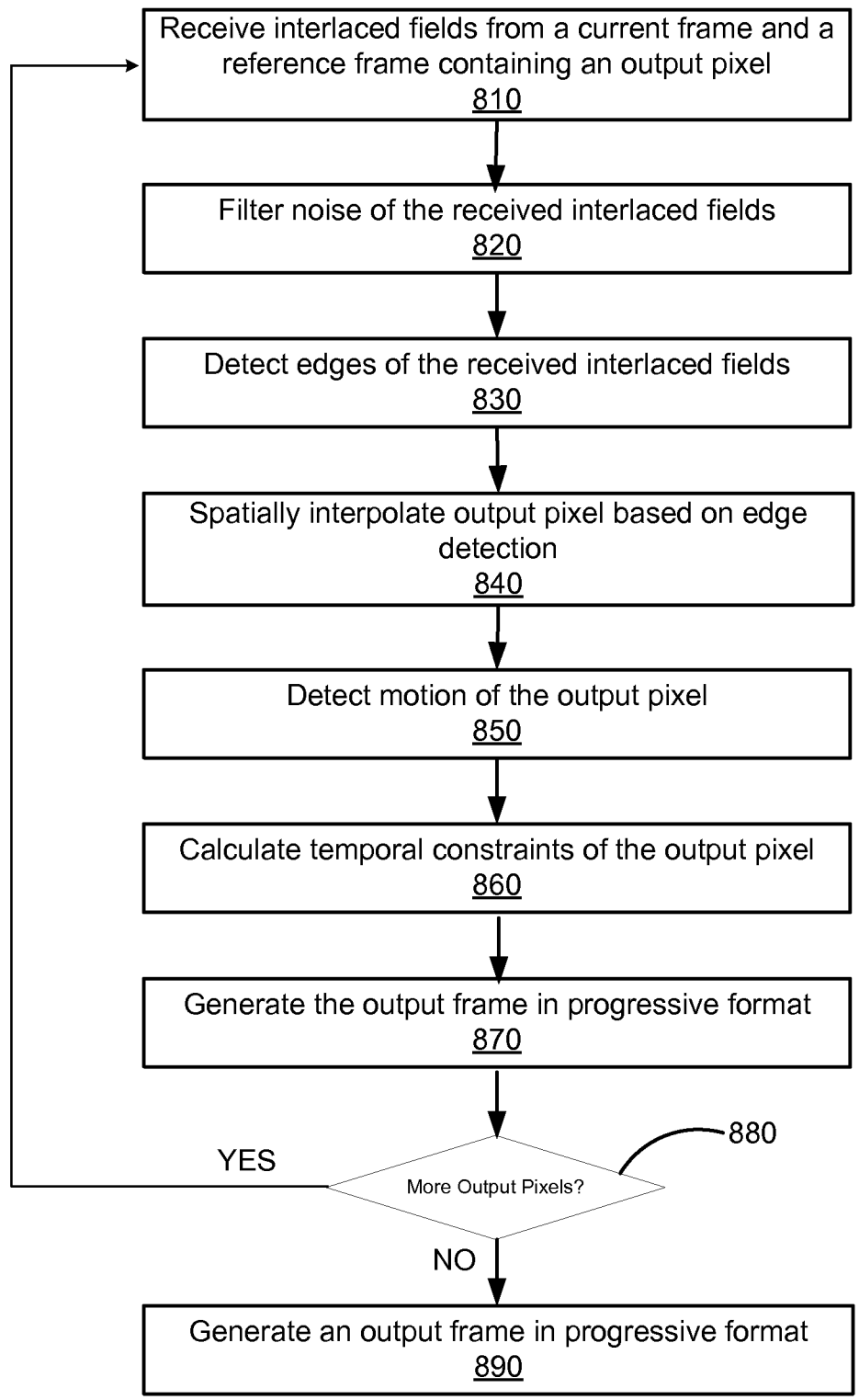
FIG. 8 is a flowchart of motion adaptive deinterlacing of a video sequence according to one embodiment.

FIG. 8 is a flowchart of motion adaptive deinterlacing of a video sequence according to one embodiment. Initially, the MADI deinterlacer 300 receives 810 two pairs of interlaced fields, two of which are from a current frame and the other two are from a reference frame (e.g., the previous frame) of the current frame. The MADI deinterlacer 300 filters 820 noise of the received interlaced fields. In one embodiment, the MADI deinterlacer 300 uses a blur filter, e.g., a 3×3 Gaussian filter or a 1-D smoothing filter. The MADI deinterlacer 300 detects 830 edges of the received interlaced fields. In one embodiment, the MADI deinterlacer 300 uses a Sobel operator, e.g., a Sobel gradient operator, to detect edges. From the detected edges, the MADI deinterlacer 300 spatially interpolates 840 an output pixel using directional filtering. In one embodiment, the MADI deinterlacer 300 investigates 9 directions passing through the output pixel and selects the direction which provides the smallest difference between the spatial neighboring pixels of the output pixel.

The MADI deinterlacer 300 also detects 850 motion of the output pixel based on the four input fields of the current frame and its reference frame. In one embodiment, the MADI deinterlacer 300 uses a window-based motion detection based on SADs of the input fields. The MADI deinterlacer 3000 calculates 860 temporal constraints of the output pixel. In one embodiment, two types of temporal constraints are calculated, one of which is based on same parity field difference and the other of which is based on opposite parity field difference. To reduce inaccurately detected motion, the MADI deinterlacer 300 calculates the temporal constraint based on opposite parity field difference to detect finger like patterns and horizontal thin line.

Based on the temporal interpolation and spatial interpolation of the output pixel, the MADI deinterlacer 300 blends the temporal and spatial interpolation of the output pixel to generate 870 an output pixel in progressive format. The MADI deinterlacer 300 checks 880 whether there are more output pixels to be deinterlaced. Responsive to more output pixels to be deinterlaced, the MADI deinterlacer 300 repeats the steps of 810 to 870; otherwise, the MADI deinterlacer 300 generates 890 a progressive output frame comprising the output pixels in progressive format.

Application of MADI—Parameter Set Processing in Transcoding

The motion adaptive deinterlacing disclosed above can be applied to video transcoding. There are two possible types of input to the motion adaptive deinterlacer: a decoded frame picture or a pair of decoded field pictures. In case of a decoded frame pictured, the MADI deinterlacer 300 is configured to communicate with a transcoding process module, such as a scaler, that processes one set of parameters including determining motion vectors of the input frame. In case of a pair of decoded field pictures, there are two sets of parameters to process: one of a top field, and one of a bottom field. The MADI deinterlacer 300 receives the two sets of field parameters and creates one (frame) output parameter set and writes to an output buffer.

To improve the efficiency of motion estimation process in deinterlacing for video transcoding, the motion vector information can be reused for deinterlacing. In one embodiment, the MADI deinterlacer 300 communicates with a transcoding process module (e.g., a scaler) for motion vector information reuse. It is noted that by nature of deinterlacing, all the top field pixels of an input picture are untouched and become the even row pixels of deinterlaced picture. The odd pixel rows are either based on bottom field of the input picture, if there is no motion detected, or interpolation of top field pixels, when motion is detected. This allows top field to top field motion vectors to be used as reuse motion vectors.

There are four possible motion vectors for each macroblock of the input frame for motion vector reuse consideration:

Top field to top field motion vector: This motion vector will be used as reuse untouched.

Top field to bottom field motion vector: This motion vector will be scaled temporally to create a top field to top field motion vector.

Bottom field to bottom field motion vector: This motion vector will be used as reuse untouched.

Bottom field to top field motion vector: This motion vector will be scaled temporally to create a top field to top field motion vector.

Application of MADI—Operating Modes of Deinterlacer

The MADI deinterlacer 300 is further configured to operate in different modes, including MADI mode for regular interlaced video input as described with references to FIGS. 2-8, two special modes, one for a reverse 3:2 pull down mode for 3:2 pull down video input and one for a pass through mode for progressive video content. A reverse 3:2 pull down mode for 3:2 pull down video input means transforming a video frame rate from 60-field/second to 24-frame/second. The reasons for supporting reverse 3:2 pull down mode and pass through mode is sometimes input video streams are flagged as interlaced but they are not actually interlaced. In these cases, the MADI deinterlacer 300 uses deinterlacing statistics collected during deinterlacing process to detect and run in the two special modes when required.

To assist with 3:2 pull down and scene change detection, statistics are generated from the current field and its previous field (of the same parity) during deinterlacing process and are used for further transcoding processing. In one embodiment, each field is subdivided into a number of blocks, where each block is of size X pixels and Y lines. A sum of absolute difference (SAD) is computed for each block by summing the absolute difference between the current field pixel and its collocated previous field pixel over the entire block. In addition, a square of the block Mean-of-Absolute-Difference (MAD) is also calculated. One example of the definitions of the blockSAD and squareBlockMAD is described below:

$$blockSAD = \sum_{pixelsinblock} pixelSAD$$

$$blockMAD = \frac{\left(blockSAD + \frac{blockSize}{2}\right)}{blockSize}$$

$$squareBlockMAD = blockMAD * blockMAD$$

From the resulting set of SAD values, the maximum and minimum values are sampled for each field. In addition, the sum of SAD value for the entire field is also sampled. The block dimension is programmable. In one embodiment, Y is limited to 8 lines, matching the memory height of one embodiment of the MADI deinterlacer 300. X can be set to be 8, 16 or 32. Four values per field can be produced from the deinterlacing process, i.e., maximum (16-bits), minimum (16-bits), sum (32-bits) of the blockSAD, as well as the squareBlockMAD (32-bit).

Before the MADI deinterlacer 300 operating in different modes, in one embodiment, the MADI deinterlacer 300 detects the different modes of an input video. Table 8 illustrates one embodiment of the operating mode detection for luma components of the input video. For chroma components of the input video, single field interpolation is used.

TABLE 8

Operating Mode Detection

```
//Detect regular interlacing
interlaceCounter = 0
interlaceDetected = 1
for (all input field pairs)
   if (fingerPixelCount>th_finger_interlace)
      interlaceCounter ++
   else
      interlaceCounter = 0
   if (interlaceCounter>=3) // break out of 3:2 pull-down
      interlaceDetected = 1
//Detect 3:2 pull down
for (all input field pairs)
   // note top-to-top/bot-to-bot need to be consecutive
   if (maxBlockSad shows very small top-to-top or bot-to-bot field
   differences every 5 field pairs)
      32pullDownDetected = 1
   else
      32pullDownDetected = 0
//Detect progressive
for (all input field pairs)
```

TABLE 8-continued

Operating Mode Detection

```
progressiveCounter = 0
progressiveDetected = 0
if (motionPixelCount>th_motion_prog_detection &&
fingerPixelCount<th_finger_progressive
    progressiveCounter ++
else
    progressiveCounter = 0
if (progressiveCounter>=5) // break out of 3:2 pull down
    progressiveDetected = 1
```

Figure 9:
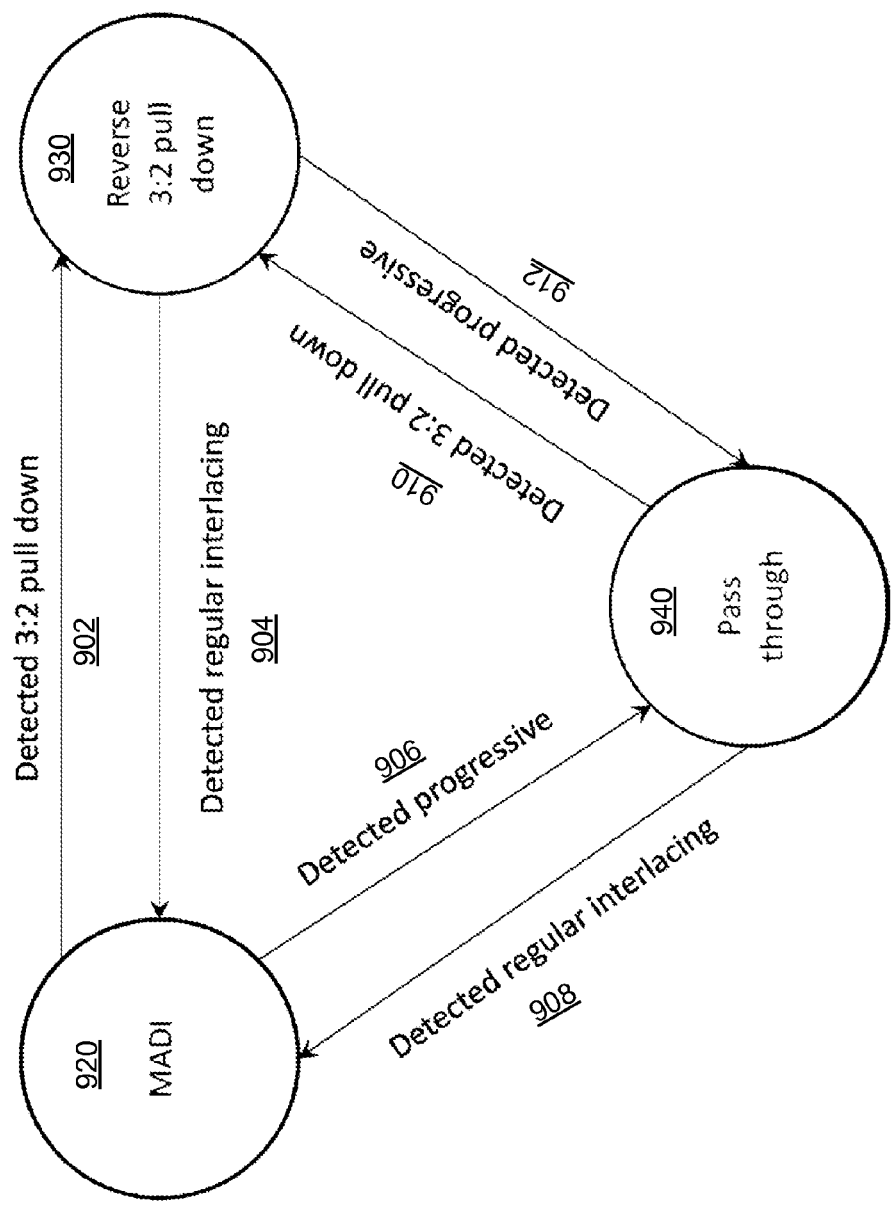
FIG. 9 illustrates an example of application of motion adaptive deinterlacing in different operating modes.

FIG. 9 illustrates an example of application of motion adaptive deinterlacing in different operating modes for luma components of an input video. The three different operating modes are MADI 920, reverse 3:2 pull down 930 and pass through 940. Responsive to detection of regular deinterlacing 904, the MADI deinterlacer 300 operates in the regular deinterlacing mode MADI 920. Responsive to detection of 3:2 pull down deinterlacing 902, the MADI deinterlacer 300 operates in the reverse 3:2 pull down mode 930. Responsive to detection of progressive deinterlacing 906, the MADI deinterlacer 300 operates in the pass through mode 940. The MADI deinterlacer 300 switches between the different operating modes depending on the detected operating mode.

Application of MADI—Motion Adaptive Deinterlacer in Transcoding

In an example video proceeding scenario, the MADI deinterlacer 300 takes in 4 consecutive fields (2 field pairs/frames) as input. However, in video transcoding, a frame may get decoded and encoded on the fly where a current frame may not have its immediately preceding frame available since it may not have been decoded yet. In this case, the MADI deinterlacer 300 is adapted to use the nearest available frame as in input.

Below is one example of applying motion adaptive deinterlacing for transcoding, where there is a sequence of frames, from I1 through P7, where the letter denotes the frame type (e.g., I for intra frames, P for predictive frames and B for bi-directionally predicted frames) and the number denotes the display order of the sequence.

I1 B2 B3 P4 B5 B6 P7

The sequence of above frames is typically encoded in the following order:

I1 P4 B2 B3 P7 B5 B6

In the video transcoding case, where each picture is transcoded on the fly. For example, when P4 is transcoded, its immediate previous frame B3 is not yet decoded and therefore is not available. In this case, the MADI deinterlacer 300 is adapted to use {I1, P4} as the two input field pairs for current frame P4. Following the same principle, the MADI deinterlacer 300 uses {I1, B2}, {B2, B3}, {P4, P7}, {P4, B5}, and {B5, B6} for deinterlacing process.

A more bandwidth efficient alternative to the above algorithm uses only reference frames for deinterlacing a current frame, where the inputs to the MADI deinteralacer 300 are: {I1, P4}, {I1, B2}, {I1, B3}, {P4, P7}, {P4, B5}, and {P4, B6}. Compared to the prior algorithm, B2 and B5 do not need to be stored in memory for future use. Thus, the MADI deinterlacer 300 can be configured to flexibly choose input fields pairs depending on application requirements.

The disclosed embodiments of motion adaptive deinterlacing beneficially allow for a system and methods for deinterlacing an input video sequence. Using motion detection with temporal constraint of output pixels for deinterlacing achieves balanced tradeoff between computational complexity and high quality of the deinterlaced video sequence in progressive format. The motion adaptive deinterlacing can flexibly support different operating modes, including a reverse 3:2 pull down mode for 3:2 pull down video content and a pass through mode for progressive video content. Applying motion adaptive deinterlacing to video transcoding is efficient through flexible selection of input fields to save memory storage and bandwidth.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, e.g., as shown and described in FIG. 3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods, e.g., described with FIG. 6, may be performed, at least partially, by one or more processors, e.g., 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented, e.g., processor 102. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors, e.g., 102, may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory 104). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for improving coding efficiency of compression with internal bit depth increase through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for deinterlacing an input video sequence, the method comprising:
   receiving a first pair of fields of a current frame of the input video and a second pair of fields of a reference frame of the input video, the first pair of fields comprising at least one output pixel to be interpolated and the input video being in interlaced format;
   filtering noise of the received fields of the current frame and the reference frame;
   detecting one or more edges of the filtered fields of the current frame and the reference frame;
   spatially interpolating the output pixel based on an edge selected from the detected edges;
   detecting motion of the output pixel;
   calculating temporal constraint of the output pixel based on the detected motion of the output pixel, the temporal constraint of the output pixel providing a bound of temporal changes of the output pixel, the calculating temporal constraint of the output pixel further comprises:
      calculating a first temporal constraint based on same parity field difference of the two pairs of fields of the current frame and the reference frame,
      calculating a second temporal constraint based on opposite parity field difference of the two pairs of fields of the current frame and the reference frame, and
      calculating the temporal constraint of the output pixel based on the first temporal constraint and a modified second temporal constraint, the second temporal constraint being modified based on detected motion of the output pixel; and
   generating the output pixel in progressive format based on spatial interpolation of the output pixel and temporal interpolation derived from the temporal constraint of the output pixel.

2. The method of claim 1, further comprising collecting and storing the plurality of deinterlacing statistics of the pixels of the input video, the plurality of deinterlacing statistics including at least motion vectors of frames of the input video.

3. The method of claim 1, wherein filtering noise of the received fields comprises:
   applying a blur filter to the fields to generate blurred fields with reduced image noise, the blur filter being a one-dimensional 3-tap filter applied to the output pixel and two horizontal neighboring pixels of the output pixel.

4. The method of claim 1, wherein detecting one or more edges of the received fields comprises:
   applying a Sobel operator to the received fields to detect one or more edges.

5. The method of claim 1, wherein spatially interpolating the output pixel based on an edge selected from the detected edges comprises:
   analyzing a plurality of edge directions of the output pixel, an edge direction of the output pixel passing through the output pixel and the direction being represented by a first pixel of a first scan line and a second pixel of a second scan line;
   for each edge direction, calculating difference between the two pixels representing the direction;
   selecting an edge direction among the plurality of edge directions, the selected edge direction providing the smallest difference among the differences of the plurality of edge directions;
   calculating spatial pixel value of the output pixel based on the pixels representing the selected edge direction.

6. The method of claim 1, wherein detecting motion of the output pixel comprises:
   computing a sum of absolute difference between a filtered top field of the first pair of fields of the current frame and a filtered top field of the second pair of fields of the reference frame;
   computing a sum of absolute difference between a filtered bottom field of the first pair of fields of the current frame and a filtered bottom field of the second pair of fields of the reference frame;
   computing a total sum of absolute difference based on the sum of absolute difference from the top fields and the sum of absolute difference from the bottom fields of the current frame and the reference frame;
   comparing the total sum of absolute difference with a motion threshold; and
   setting a motion flag responsive to comparison of the total sum of absolute difference and the motion threshold, the motion flag indicating whether motion is detected of the output pixel.

7. The method of claim 1, wherein generating the output pixel in progressive format comprises:
   determining whether a four-field blending is needed to generate the output pixel in progressive format based on detected motion of the output pixel; and
   combining the spatial interpolation and the temporal interpolation of the output pixel to generate the output pixel in progressive format responsive to the determination of four-field blending.

8. The method of claim 1, further comprising:
   detecting type of video content of the input video, the type of video content being one of a plurality of types of video content comprising regular interlaced video content, 3:2 pull down video content and progressive video content; and
   deinterlacing the input video in an operating mode selected based on the detected type of video content of the input video.

9. A non-transitory computer-readable storage medium storing computer program instructions, executed by at least a processor, for deinterlacing an input video sequence, the computer program instructions comprising instructions for:
   receiving a first pair of fields of a current frame of the input video and a second pair of fields of a reference frame of the input video, the first pair of fields comprising at least one output pixel to be interpolated and the input video being in interlaced format;
   filtering noise of the received fields of the current frame and the reference frame;
   detecting one or more edges of the filtered fields of the current frame and the reference frame;
   spatially interpolating the output pixel based on an edge selected from the detected edges;
   detecting motion of the output pixel;
   calculating temporal constraint of the output pixel based on the detected motion of the output pixel, the temporal constraint of the output pixel providing a bound of temporal changes of the output pixel, the calculating temporal constraint of the output pixel further comprises:

calculating a first temporal constraint based on same parity field difference of the two pairs of fields of the current frame and the reference frame, calculating a second temporal constraint based on opposite parity field difference of the two pairs of fields of the current frame and the reference frame, and calculating the temporal constraint of the output pixel based on the first temporal constraint and a modified second temporal constraint, the second temporal constraint being modified based on detected motion of the output pixel; and generating the output pixel in progressive format based on spatial interpolation of the output pixel and temporal interpolation derived from the temporal constraint of the output pixel.

10. The computer-readable storage medium of claim 9, wherein the computer program instructions for filtering noise of the received fields comprise computer program instructions for:

applying a blur filter to the fields to generate blurred fields with reduced image noise, the blur filter being a one-dimensional 3-tap filter applied to the output pixel and two horizontal neighboring pixels of the output pixel.

11. The computer-readable storage medium of claim 9, wherein the computer program instructions for detecting one or more edges of the received fields comprise computer program instructions for:

applying a Sobel operator to the received fields to detect one or more edges.

12. The computer-readable storage medium of claim 9, wherein the computer program instructions for spatially interpolating the output pixel based on an edge selected from the detected edges comprise computer program instructions for:

analyzing a plurality of edge directions of the output pixel, an edge direction of the output pixel passing through the output pixel and the direction being represented by a first pixel of a first scan line and a second pixel of a second line;

for each edge direction, calculating difference between the two pixels representing the direction;

selecting an edge direction among the plurality of edge directions, the selected edge direction providing the smallest difference among the differences of the plurality of edge directions;

calculating spatial pixel value of the output pixel based on the pixels representing the selected edge direction.

13. The computer-readable storage medium of claim 9, wherein the computer program instructions for detecting motion of the output pixel comprise computer program instructions for:

computing a sum of absolute difference between a filtered top field of the first pair of fields of the current frame and a filtered top field of the second pair of fields of the reference frame;

computing a sum of absolute difference between a filtered bottom field of the first pair of fields of the current frame and a filtered bottom field of the second pair of fields of the reference frame;

computing a total sum of absolute difference based on the sum of absolute difference from the top fields and the sum of absolute difference from the bottom fields of the current frame and the reference frame;

comparing the total sum of absolute difference with a motion threshold; and setting a motion flag responsive to comparison of the total sum of absolute difference and the motion threshold, the motion flag indicating whether motion is detected of the output pixel.

14. The computer-readable storage medium of claim 9, wherein the computer program instructions for generating the output pixel in progressive format comprise computer program instructions for:

determining whether a four-field blending is needed to generate the output pixel in progressive format based on detected motion of the output pixel; and combining the spatial interpolation and the temporal interpolation of the output pixel to generate the output pixel in progressive format responsive to the determination of four-field blending.

15. A computer system for deinterlacing an input video sequence, the system comprising:

a processor; and a non-transitory computer-readable storage medium storing computer program instructions, executed by the processor, the computer program instructions comprising instructions for:

receiving a first pair of fields of a current frame of the input video and a second pair of fields of a reference frame of the input video, the first pair of fields comprising at least one output pixel to be interpolated and the input video being in interlaced format;

filtering noise of the received fields of the current frame and the reference frame;

detecting one or more edges of the filtered fields of the current frame and the reference frame;

spatially interpolating the output pixel based on an edge selected from the detected edges;

detecting motion of the output pixel;

calculating temporal constraint of the output pixel based on the detected motion of the output pixel, the temporal constraint of the output pixel providing a bound of temporal changes of the output pixel, the calculating temporal constraint of the output pixel further comprises:

calculating a first temporal constraint based on same parity field difference of the two pairs of fields of the current frame and the reference frame, calculating a second temporal constraint based on opposite parity field difference of the two pairs of fields of the current frame and the reference frame, and calculating the temporal constraint of the output pixel based on the first temporal constraint and a modified second temporal constraint, the second temporal constraint being modified based on detected motion of the output pixel; and generating the output pixel in progressive format based on spatial interpolation of the output pixel and temporal interpolation derived from the temporal constraint of the output pixel.

16. The system of claim 15, wherein the computer program instructions for spatially interpolating the output pixel based on an edge selected from the detected edges comprise computer program instructions for:

analyzing a plurality of edge directions of the output pixel, an edge direction of the output pixel passing through the output pixel and the direction being represented by a first pixel of a first scan line and a second pixel of a second line;

for each edge direction, calculating difference between the two pixels representing the direction;

selecting an edge direction among the plurality of edge directions, the selected edge direction providing the smallest difference among the differences of the plurality of edge directions;

calculating spatial pixel value of the output pixel based on the pixels representing the selected edge direction.

17. The system of claim 15, wherein the computer program instructions for detecting motion of the output pixel comprise computer program instructions for:

computing a sum of absolute difference between a filtered top field of the first pair of fields of the current frame and a filtered top field of the second pair of fields of the reference frame;

computing a sum of absolute difference between a filtered bottom field of the first pair of fields of the current frame and a filtered bottom field of the second pair of fields of the reference frame;

computing a total sum of absolute difference based on the sum of absolute difference from the top fields and the sum of absolute difference from the bottom fields of the current frame and the reference frame;

comparing the total sum of absolute difference with a motion threshold; and setting a motion flag responsive to comparison of the total sum of absolute difference and the motion threshold, the motion flag indicating whether motion is detected of the output pixel.

18. The method of claim 1, further comprising:

detecting a deinterlacing mode of the input video sequence; and adaptively deinterlacing the input video sequence responsive to the detected deinterlacing mode.

19. The method of claim 18, wherein determining a deinterlacing mode of the input video sequence comprise:

partitioning each field of the current frame and each field of the reference frame into a plurality of blocks;

calculating a sum of absolute difference between a block of a field of the current frame and its corresponding block of a corresponding field of the reference frame; and determining the deinterlacing mode based on the calculated sum of absolute difference.

20. The method of claim 18, wherein adaptively deinterlacing the input video sequence comprise:

responsive the detected deinterlacing mode being a reverse 3:2 pull down mode:

transforming video frame rate of the input video sequence; and collecting statistics from deinterlacing the fields of the current frame and the reference frame.

* * * * *